(12) United States Patent
Daniel

(10) Patent No.: US 7,421,857 B1
(45) Date of Patent: Sep. 9, 2008

(54) PROCESS FOR FABRICATING GLASS ART

(76) Inventor: Karen Daniel, 1119 Post Ave., Holland, MI (US) 49424

( * ) Notice: Subject to any disclaimer, the term of this patent is extended or adjusted under 35 U.S.C. 154(b) by 431 days.

(21) Appl. No.: 11/092,365

(22) Filed: Mar. 29, 2005

Related U.S. Application Data

(60) Provisional application No. 60/621,728, filed on Oct. 25, 2004.

(51) Int. Cl.
*C03C 27/02* (2006.01)
*C03C 27/08* (2006.01)
(52) U.S. Cl. .............................. 65/59.1; 65/59.3; 428/7
(58) Field of Classification Search ...................... 65/40, 65/50, 58, 59.1, 59.2, 59.24, 59.28, 59.3, 65/59.33, 59.34, 33.5, DIG. 3; 403/265; 428/99, 187, 7, 12, 32, 42.1, 66.5, 542.2
See application file for complete search history.

(56) References Cited

U.S. PATENT DOCUMENTS

| | | | | | |
|---|---|---|---|---|---|
| 1,739,825 | A | * | 12/1929 | Cornwell et al. | ................ 65/70 |
| 2,092,784 | A | * | 9/1937 | Stechbart | ..................... 362/566 |
| 3,607,176 | A | * | 9/1971 | Milochevitch et al. | ....... 65/32.2 |
| 4,775,647 | A | * | 10/1988 | Smith, III | ..................... 501/15 |
| 5,378,512 | A | * | 1/1995 | Van Wyk | ...................... 428/11 |
| 5,599,092 | A | * | 2/1997 | Yen | ............................. 362/294 |
| 5,981,004 | A | * | 11/1999 | Kostic | .......................... 428/16 |
| 7,056,409 | B2 | * | 6/2006 | Dubrow | ...................... 156/276 |
| 2004/0131800 | A1 | * | 7/2004 | Bolis | ............................. 428/7 |

* cited by examiner

*Primary Examiner*—Steven P. Griffin
*Assistant Examiner*—DeMaris R. Wilson
(74) *Attorney, Agent, or Firm*—King & Partners, PLC

(57) ABSTRACT

A process for fabricating glass art, comprising the steps of: (a) providing a first substrate and a second substrate, wherein each of the first and second substrates comprises an upper surface and a lower surface; (b) providing at least one wire, wherein the at least one wire comprises a first end, a second end, and a length therebetween; (c) associating the first end of the at least one wire with the lower surface of the first substrate and the upper surface of the second substrate; (d) heating the first and second substrates and the at least one wire from ambient temperature to an elevated temperature ranging from approximately 1,000 degrees Fahrenheit to approximately 2,000 degrees Fahrenheit over a period of time ranging from approximately 0.5 hours to approximately 10 hours; (e) maintaining the elevated temperature for a period of time ranging from approximately 1 minute to approximately 30 minutes; and (f) cooling the first and second substrates and the at least one wire from the elevated temperature to ambient temperature over a period of time ranging from approximately 0.5 hours to approximately 30 hours.

17 Claims, 5 Drawing Sheets

US 7,421,857 B1

PROCESS FOR FABRICATING GLASS ART

CROSS-REFERENCE TO RELATED APPLICATION(S)

This application claims the benefit of U.S. Provisional Application Ser. No. 60/621,728 filed Oct. 25, 2004, entitled "GLASS ART AND ASSOCIATED PROCESS FOR FABRICATING THE SAME" which is hereby incorporated herein by reference in its entirety, including all references cited therein.

BACKGROUND OF THE INVENTION

1. Field of the Invention

The present invention relates in general to a process for fabricating glass art, and more particularly, to a process for fabricating a fused, unitary glass art design having wire associated therewith.

2. Background Art

Processes for fabricating glass art have been known in the art for several years. Furthermore, processes for fabricating a fused, unitary glass art design having wire associated therewith have likewise been known in the art. While conventional processes for fabricating glass art having wire associated therewith have become popular, fabricating a fused, unitary glass art design having wire associated therewith, among other things, remains largely problematic. In particular, associating wire with glass can produce distortions and/or place undue stress on the glass art. Consequently, the beauty, as well as the durability and strength, of such artwork remains compromised, preventing many desirable uses thereof. Furthermore, glass art designs having a fused, unitary structure additionally avail the manufacturer with a plurality of shipping options not hereto available inasmuch as the fragility of non-fused glass art can eliminate a plurality of cost effective shipping options.

It is therefore an object of the present invention to provide a process for fabricating a fused, unitary glass art design having wire associated therewith which, among other things, remedies the aforementioned detriments and/or complications associated with fabricating a fused, unitary glass art designs.

SUMMARY OF THE INVENTION

The present invention is directed to a process for fabricating glass art comprising the steps of: (a) providing a first substrate and a second substrate, wherein each of the first and second substrates comprises an upper surface and a lower surface; (b) providing at least one wire, wherein the at least one wire comprises a first end, a second end, and a length therebetween; (c) associating the first end of the at least one wire with the lower surface of the first substrate and the upper surface of the second substrate; and (d) heating the first and second substrates and the at least one wire from ambient temperature to an elevated temperature ranging from approximately 1,000 degrees Fahrenheit to approximately 2,000 degrees Fahrenheit over a period of time ranging from approximately 0.5 hours to approximately 10 hours; (e) maintaining the elevated temperature for a period of time ranging from approximately 1 minute to approximately 30 minutes; and (f) cooling the first and second substrates and the at least one wire from the elevated temperature to ambient temperature over a period of time ranging from approximately 0.5 hours to approximately 30 hours.

In a preferred embodiment of the present invention, the step of providing a first substrate and a second substrate includes the step of providing a first substrate and a second substrate, wherein the first and second substrates comprise substantially analogous shapes and sizes.

In another preferred embodiment of the present invention, the step of providing a first substrate and a second substrate includes the step of providing a substantially clear and colorless first substrate.

In yet another preferred embodiment of the present invention, the step of providing a first substrate and a second substrate includes the step of providing a substantially transparent, colored second substrate.

In a further preferred embodiment of the present invention, the step of providing a first substrate and a second substrate includes the step of providing a first substrate and a second substrate, wherein each of the first and second substrates comprises 90 COE or 96 COE glass.

In another preferred embodiment of the present invention, the step of associating the first end of the at least one wire with the lower surface of the first substrate and the upper surface of the second substrate includes the step of associating a substantially flattened first end of the at least one wire with the lower surface of the first substrate and the upper surface of the second substrate.

Preferably, the present invention may further comprise the step of associating at least one glass member with the upper surface of the first substrate after the step of associating the first end of the at least one wire with the lower surface of the first substrate and the upper surface of the second substrate. In this embodiment, the step of associating at least one glass member with the upper surface of the first substrate preferably includes the step of associating at least one substantially opaque, colored glass member with the upper surface of the first substrate.

In a preferred embodiment of the present invention, the step of heating the first and second substrates and the at least one wire from ambient temperature to an elevated temperature ranging from approximately 1,000 degrees Fahrenheit to approximately 2,000 degrees Fahrenheit over a period of time ranging from approximately 0.5 hours to approximately 10 hours includes the step of heating the first and second substrates and the at least one wire from ambient temperature to an elevated temperature of approximately 1,500 degrees Fahrenheit.

In another preferred embodiment of the present invention, the step of heating the first and second substrates and the at least one wire from ambient temperature to an elevated temperature ranging from approximately 1,000 degrees Fahrenheit to approximately 2,000 degrees Fahrenheit over a period of time ranging from approximately 0.5 hours to approximately 10 hours includes the step of heating the first and second substrates and the at least one wire from ambient temperature to an elevated temperature over a period of time ranging from approximately 1 hour to approximately 5 hours.

Preferably, the step of maintaining the elevated temperature for a period of time ranging from approximately 1 minute to approximately 30 minutes includes the step of maintaining the elevated temperature for a period of time ranging from approximately 3 minutes to approximately 10 minutes.

In a preferred embodiment of the present invention, the step of cooling the first and second substrates and the at least one wire from the elevated temperature to ambient temperature over a period of time ranging from approximately 0.5 hours to approximately 30 hours includes the step of cooling the first and second substrates and the at least one wire from the elevated temperature to ambient temperature over a period of time ranging from approximately 5 hours to approximately 10 hours.

It is preferred that the present invention may further comprise the step of associating at least one ornamental member with the length of the at least one wire after the step of cooling the first and second substrates and the at least one wire from the elevated temperature to ambient temperature.

Preferably, the present invention may further comprise the step of associating the lower surface of the second substrate with a bracket after the step of cooling the first and second substrates and the at least one wire from the elevated temperature to ambient temperature. In this embodiment, the present invention further comprises the step of associating the bracket with a nightlight apparatus after the step of associating the lower surface of the second substrate with a bracket.

The present invention is also directed to a process for fabricating glass art, comprising the steps of: (a) providing a substantially clear and colorless first substrate; (b) providing a substantially transparent, colored second substrate, wherein the first and second substrates comprise substantially analogous shapes and sizes, wherein each of the first and second substrates comprises 90 COE or 96 COE glass, and wherein each of the first and second substrates comprises an upper surface and a lower surface; (c) providing at least one wire, wherein the at least one wire comprises a substantially flattened first end, a second end, and a length therebetween; (d) associating the substantially flattened first end of the at least one wire with the lower surface of the first substrate and the upper surface of the second substrate; (e) associating at least one substantially opaque, colored glass member with the upper surface of the first substrate; (f) heating the first and second substrates and the at least one wire from ambient temperature to an elevated temperature of approximately 1,500 degrees Fahrenheit over a period of time ranging from approximately 1 hour to approximately 5 hours; (g) maintaining the elevated temperature for a period of time ranging from approximately 3 minutes to approximately 10 minutes; (h) cooling the first and second substrates and the at least one wire from the elevated temperature to ambient temperature over a period of time ranging from approximately 5 hours to approximately 10 hours; and (i) associating at least one ornamental member with the length of the at least one wire.

In a preferred embodiment, the invention further comprises the step of associating the lower surface of the second substrate with a bracket after the step of cooling the first and second substrates and the at least one wire from the elevated temperature to ambient temperature. In this embodiment, the invention further comprises the step of associating the bracket with a nightlight apparatus after the step of associating the lower surface of the second substrate with a bracket.

Furthermore, the present invention is directed to a piece of glass art fabricated according to at least one of the above-identified methods.

BRIEF DESCRIPTION OF THE DRAWINGS

The invention will now be described with reference to the drawings wherein.

DETAILED DESCRIPTION OF THE DRAWINGS

Figure 1:
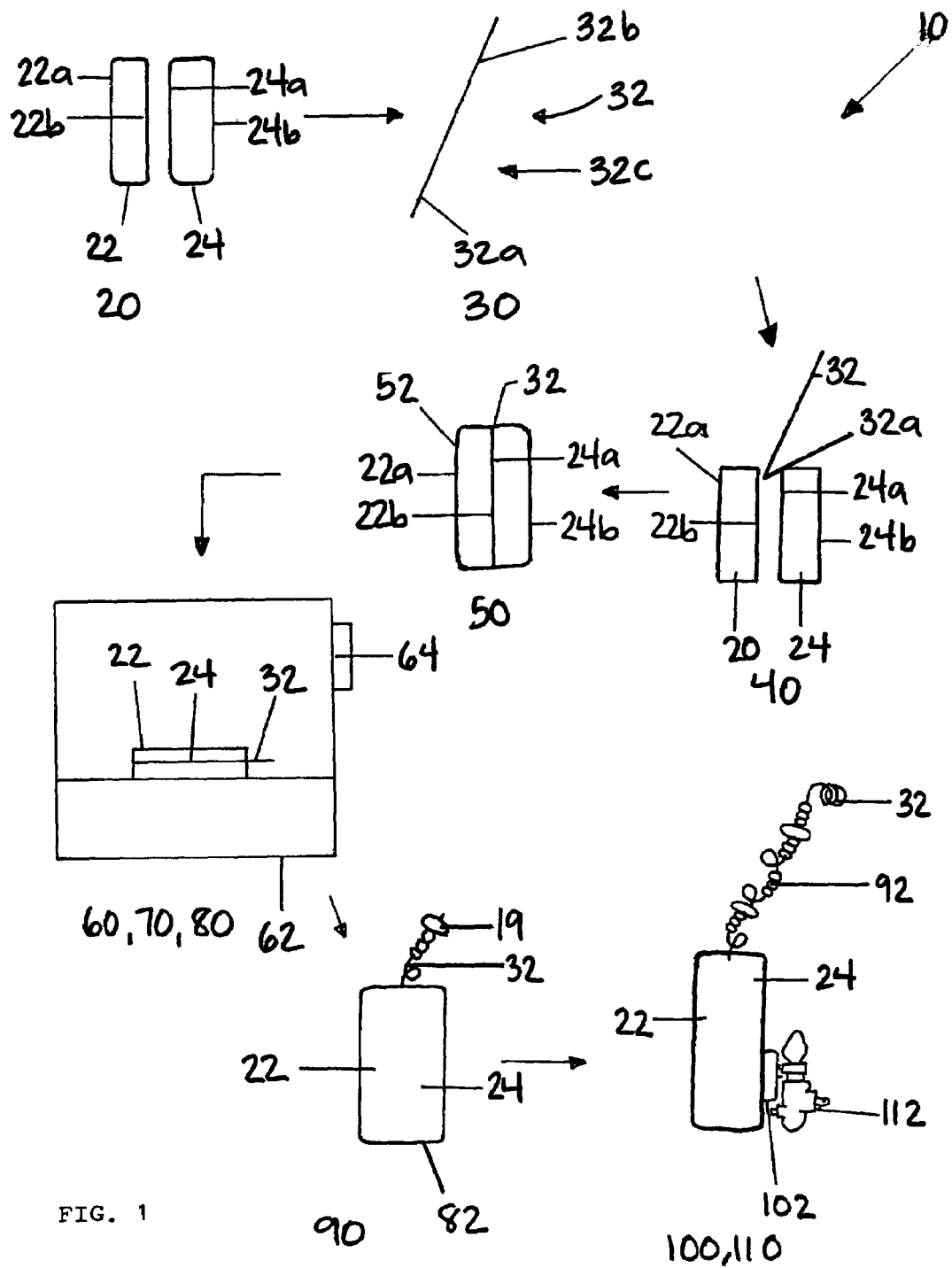
FIG. 1 of the drawings is a schematic representation of a process for fabricating glass art showing, among other things, the steps of providing substrates, providing wire, associating wire, associating glass member(s), heating, maintaining an elevated temperature, cooling, associating ornamental member(s), associating a bracket, and associating a nightlight apparatus.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters. It will further be understood that FIGS. 1-5 are merely schematic representations. As such, some of the components may be distorted from their actual scale for pictorial clarity.

Referring now to the drawings, and to FIG. 1 in particular, a schematic representation of an embodiment of process 10 for fabricating glass art 12 (FIG. 2) is shown, which generally comprises substrates providing step 20, wire providing step 30, wire associating step 40, glass member associating step 50, heating step 60, maintaining elevated temperature step 70, cooling step 80, ornamental member associating step 90, bracket associating step 100, and nightlight apparatus associating step 110.

For purposes of the present disclosure, substrates providing step 20 generally comprises providing a first substrate 22 having an upper surface 22a and a lower surface 22b and a second substrate 24 having an upper surface 24a and a lower surface 24b.

First substrate 22 may be fabricated from a glass material and may be transparent or substantially transparent in the visible region of the electromagnetic spectrum, such as, but not limited to, borosilicate glass, soda lime glass, float glass, art glass, or any other glass material known to those having ordinary skill in the art. In addition, the glass may be 90 COE, 96 COE, or other like COE, colored or colorless, and cold-formed and/or double-rolled. First substrate 22 is preferably fabricated from a sheet of glass having a thickness ranging from approximately 0.5 millimeters (mm) to approximately 20 mm and may comprise any one of a number of different shapes, such as, but not limited to, a circle, rectangle, triangle, polygon, fish, flipflop, or any other geometrical, whimsical, or arbitrary shape. Of course, the thickness, shape, and size of first substrate 22 will depend largely upon the particular design of glass art 12. While particular substrate materials have been disclosed, for illustrative purposes only, it will be understood that numerous other substrate materials are likewise contemplated for use—so long as the materials exhibit appropriate physical properties, such as strength to be able to withstand the temperatures necessary for fabrication of glass art 12 and durability to operate effectively during intended use.

Second substrate 24 can be fabricated from compatible, like COE, and/or other similar materials to that of first substrate 22. However, if first substrate 22 comprises substantially colorless glass, then, preferably, second substrate 24 will comprise colored glass. Second substrate 24 is preferably fabricated from a sheet of glass having a thickness ranging from approximately 0.5 mm to approximately 100 mm and, while it may comprise any one of a number of different shapes and sizes, preferably, second substrate 24 comprises a shape and size which is substantially analogous to that of first substrate 22.

Wire providing step 30 generally comprises the step of providing at least one wire 32 having a first end 32a, a second end 32b, and a length therebetween 32c. At least one wire 32 may comprise any one of a number of different lengths, diameters, and materials—with the only limitations being that at least first end 32a is capable of being flattened for association between first substrate 22 and second substrate 24 and that wire 32 must be capable of withstanding the temperatures necessary for fabrication of glass art 12. An example of a suitable material for wire 32 includes, but is by no means limited to, 16 gauge tinned wire.

Figure 2:
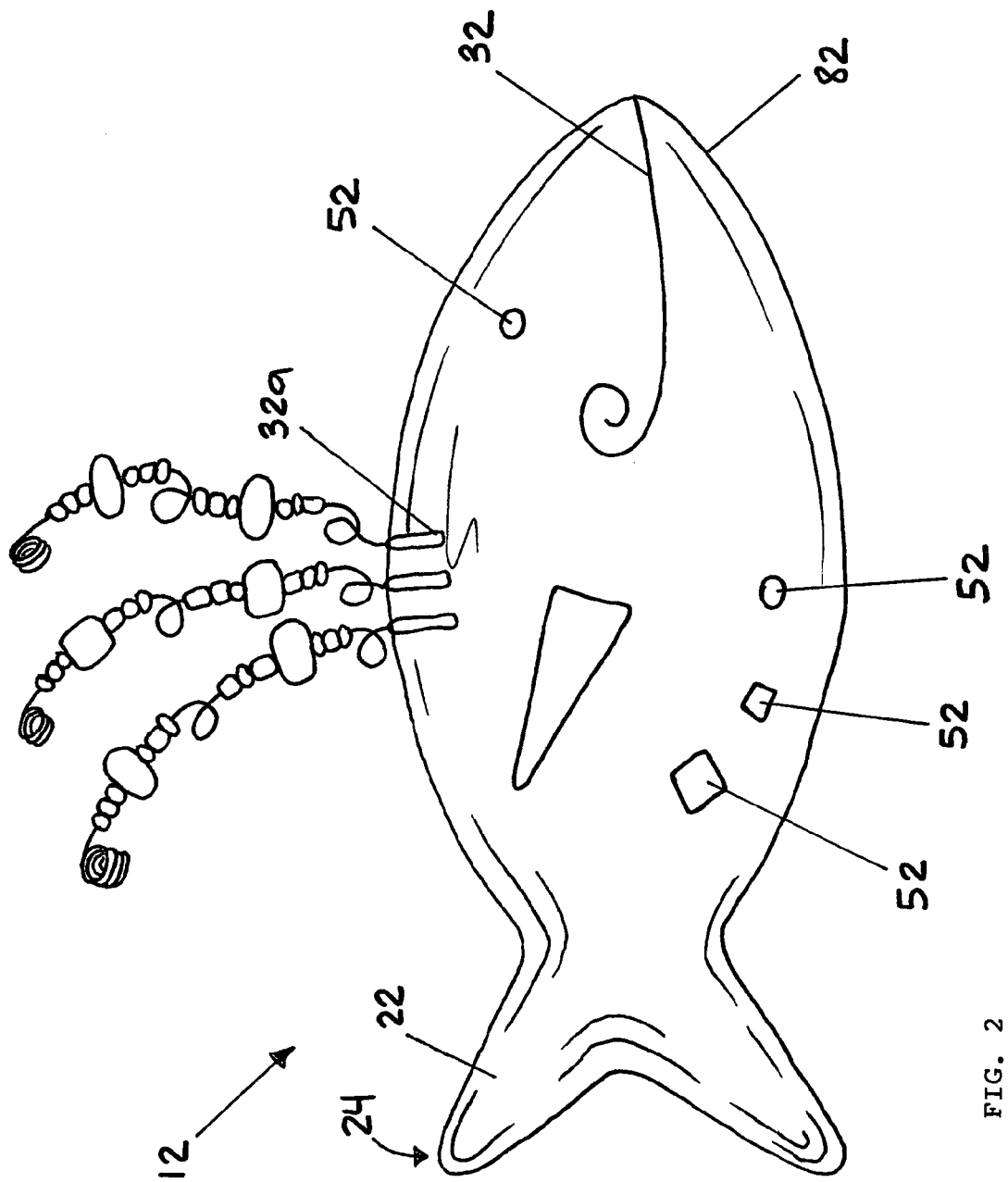
FIG. 2 of the drawings is a schematic representation of a front view of glass art fabricated in accordance with the present invention.
Figure 3:
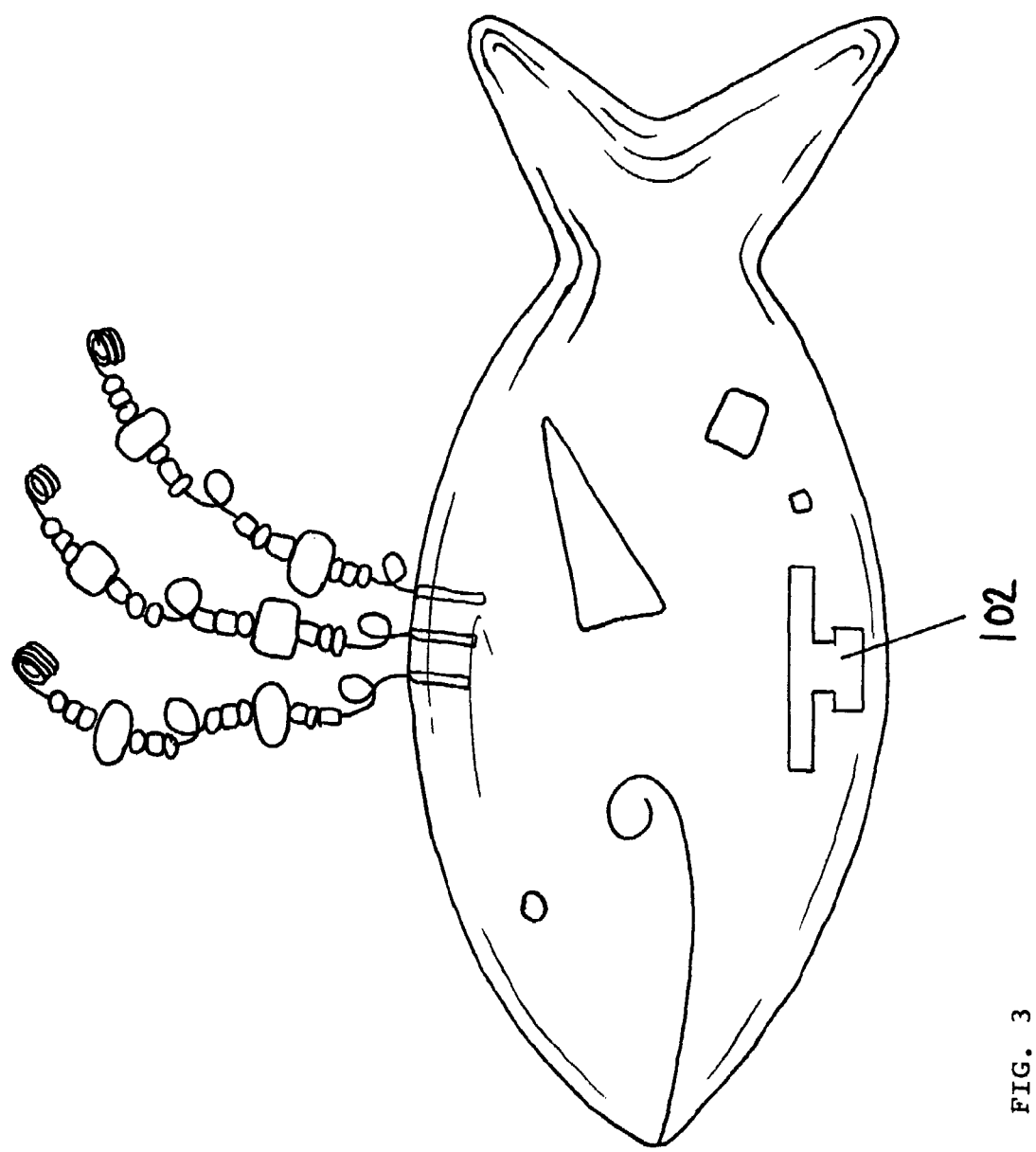
FIG. 3 of the drawings is a schematic representation of a rear view of glass art fabricated in accordance with the present invention.
Figure 5:
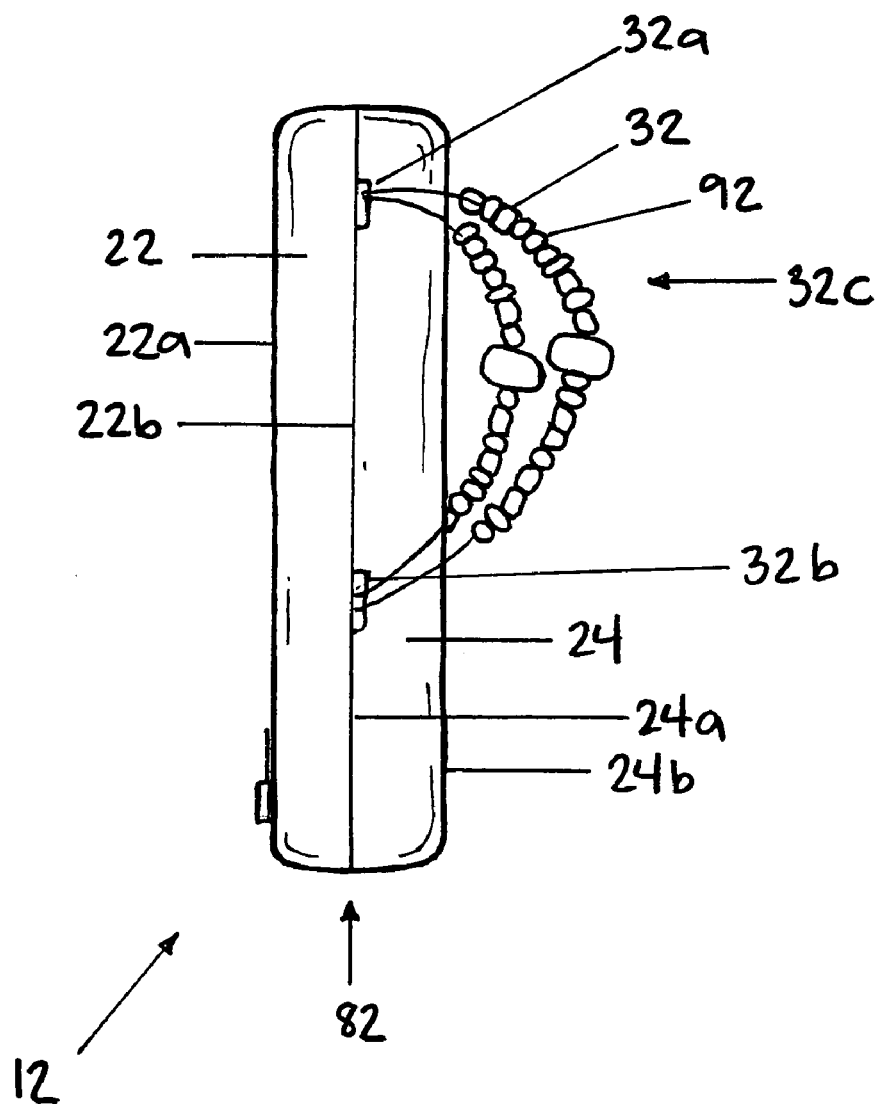
FIG. 5 of the drawings is a schematic representation of a side view of another embodiment of glass art fabricated in accordance with the present invention showing, among other things, first and second ends of a wire associated with the first and second substrates.

Wire associating step 40 generally comprises the step of associating at least first end 32a of at least one wire 32 with lower surface 22b of first substrate 22 and upper surface 24a of second substrate 24. As can be seen in FIGS. 2 and 3, preferably, first end 32a of at least one wire 32 is substantially flattened in order to minimize the diameter of at least one wire 32 and allow for maximum abutment between lower surface 22b of first substrate 22 and upper surface 24a of second substrate 24. As is shown in FIGS. 2 and 3, it is contemplated that three wires 32 be associated with lower surface 22b of first substrate 22 and upper surface 24a of second substrate 24. In this embodiment, first ends 32a of wires 32 may be substantially parallel to each other while lengths 32c and/or second ends 32b may be substantially parallel or non-parallel to one another. It will be understood that such placement of at least one wire 32 is left to the discretion of the artist and may change depending on the particular design of or application for glass art 12. In general, it is contemplated that any number of wires 32 may be associated with lower surface 22b of first substrate 22 and upper surface 24a of second substrate 24. In addition, as is shown in FIGS. 2 and 3, first end 32a, second end 32b, and length 32c therebetween of at least one wire 32 may all be associated with lower surface 22b of first substrate 22 and upper surface 24a of second substrate 24 such that the entirety of at least one wire 32 is between first substrate 22 and second substrate 24. In this embodiment, it is contemplated that at least one wire may be flattened or unflattened so long as substantial abutment between lower surface 22b of first substrate 22 and upper surface 24a of second substrate 24 may be attained. Additionally, as is shown in FIG. 5, it is contemplated that first end 32a and second end 32b of at least one wire 32 may each be associated with first substrate 22 and second substrate 24. In this embodiment, preferably, first and second ends 32a and 32b are flattened prior to association with the substrates. Therefore, it is contemplated that any part or all of at least one wire 32 may be associated with first substrate 22 and second substrate 24.

Referring back to FIG. 1, glass member associating step 50 can be seen as generally comprising the step of associating at least one glass member 52 with upper surface 22a of first substrate 22. At least one glass member 52 can be fabricated from material(s) compatible and/or similar to that of first substrate 22 and second substrate 24. However, preferably, at least one glass member 52 comprises substantially opaque, colored glass. At least one glass member 52 is preferably fabricated from a sheet of glass having a thickness ranging from approximately 0.5 mm to approximately 20 mm and, while it may comprise any one of a number of different shapes and sizes, preferably, at least one glass member 52 comprises a shape and size which is substantially smaller than that of first substrate 22 and second substrate 24. While particular materials have been disclosed, for illustrative purposes only, it will be understood that numerous other glass member materials are likewise contemplated for use, including non-glass materials—so long as the materials exhibit appropriate physical properties, such as fusion to first substrate 22 after fabrication of glass art 12 and during intended use thereof. For purposes of the present disclosure, it will be understood that while glass member associating step 50 may be a desirable step within process 10 for artistic reasons, it is not an essential component of process 10 for fabricating glass art 12 and may, therefore, be omitted if desired.

Heating step 60 generally comprises heating first substrate 22, second substrate 24, and at least one wire 32 from ambient temperature to an elevated temperature ranging from approximately 1,000 degrees Fahrenheit to approximately 2,000 degrees Fahrenheit over a period of time ranging from approximately 0.5 hours to approximately 10 hours. Preferably, heating step 60 comprises heating first substrate 22, second substrate 24, and at least one wire 32 from ambient temperature to an elevated temperature of approximately 1,500 degrees Fahrenheit over a period of time ranging from approximately 1 hour to approximately 5 hours, and, most preferably, the temperature is increased from ambient temperature to 1,500 degrees Fahrenheit on a linear scale over 2.20 hours. As can be seen in FIG. 1, a kiln 62 having a programmable logic controlled device (PLC) 64 may be utilized, such as a 220 volt electric glass kiln. However, it will be understood that any heating appliance known to those having ordinary skill in the art may be utilized which is capable of reaching the temperature and duration necessary for process 10 for fabricating glass art 12.

Maintaining elevated temperature step 70 generally comprises maintaining first substrate 22, second substrate 24, and at least one wire 32 at the elevated temperature for a period of time ranging from approximately 1 minute to approximately 30 minutes. Preferably, first substrate 22, second substrate 24, and at least one wire 32 are maintained at the elevated temperature for a period of time ranging from approximately 3 minutes to approximately 10 minutes, and, most preferably, the elevated temperature is maintained for approximately 5 minutes.

After the elevated temperature is maintained for the appropriate duration, cooling step 80 begins. Cooling step 80 generally comprises cooling first substrate 22, second substrate 24, and at least one wire 32 from the elevated temperature to ambient temperature, and is accomplished in a period of time ranging from approximately 0.5 hours to approximately 30 hours. Preferably, first substrate 22, second substrate 24, and at least one wire 32 are cooled to ambient temperature in a time period ranging from approximately 5 hours to approximately 10 hours, and most preferably in approximately 6 hours.

As is shown in FIGS. 1-5, after the completion of heating step 60, maintaining elevated temperature step 70, and cooling step 80, first substrate 22, second substrate 24, and at least one wire 32 will comprise a fused, unitary member 82 free from undue stress and/or distortion. Such a fused, unitary member 82 is highly desirable and is available for a wide variety of functions inasmuch as it comprises strength and durability while preserving the aesthetic quality of a piece of fine artwork. Furthermore, glass art 12 which comprises such a fused, unitary structure additionally avails the manufacturer with a plurality of shipping options not hereto available inasmuch as the fragility of non-fused glass art can eliminate a plurality of cost effective shipping options.

Ornamental member associating step 90 is shown in FIG. 1 as generally comprising the step of associating at least one ornamental member 92 with length 32c of at least one wire 32 after cooling step 80. At least one ornamental member 92 may comprise any one of a variety of different items such as, but not limited to, beads, baubles, trinkets, jewels, ties, and/or bows, and may be made of a variety of different types of material, such as, but not limited to plastics, fabrics, elastics, woods, metals, alloys, composites, natural resins, synthetic resins and/or any combinations thereof. It will be understood that these or any other type of materials or ornamentation known to those having skill in the art may be used and such ornamentation may be left to the discretion of the artist. At least one ornamental member 92 may be associated with length 32c of wire 32 by, for example, but by no means limited to, adhesion, tying, and/or being placed around wire 32, in which case wire 32 may be looped, knotted, and/or kinked to prevent at least one ornamental member 92 from detaching and/or slipping therefrom. For purposes of the present disclosure, it will be understood that while ornamental member associating step 90 may be a desirable step within process 10 for artistic reasons, it is not an essential component of process 10 for fabricating glass art 12 and may, therefore, be omitted if desired.

Figure 4:
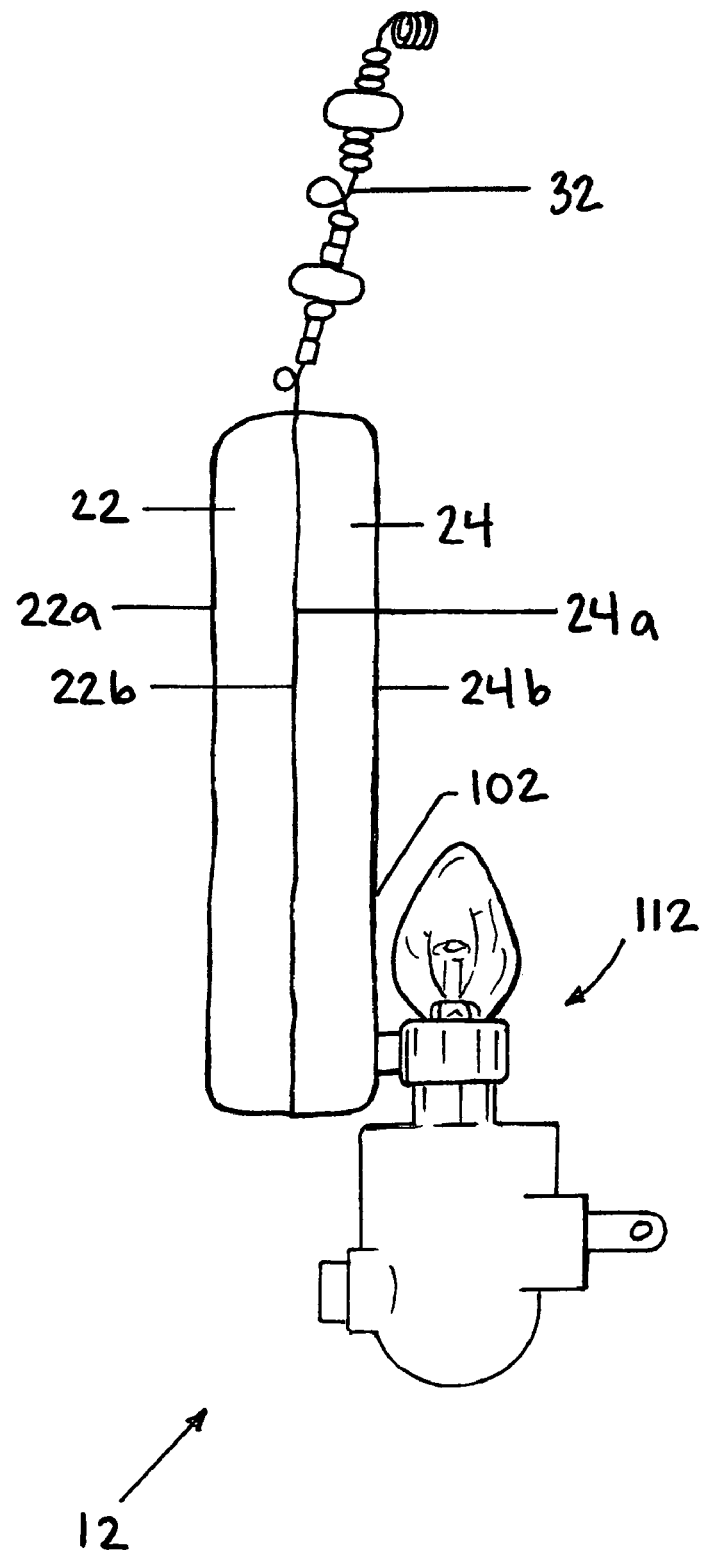
FIG. 4 of the drawings is a schematic representation of a side view of glass art fabricated in accordance with the present invention showing, among other things, a bracket and nightlight apparatus associated with the glass art.

For purposes of the present disclosure, bracket associating step 100 and nightlight apparatus associating step 110 are shown in FIG. 1. Bracket associating step 100 generally comprises the step of associating lower surface 24b of second substrate 24 with a bracket 102 after cooling step 80. Bracket 102 may comprise any one of a number of different types of brackets known to those skilled in the art and may be chosen depending on the particular application desired for glass art 12. For example, bracket 102 may comprise a form conducive to attaching to a nightlight apparatus 112, as shown in FIG. 1 and FIG. 4. In this case, nightlight apparatus associating step 110 may follow bracket associating step 100 and generally comprises the step of associating bracket 102 with nightlight apparatus 112. However, it will be understood that glass art 12 is not to be limited to any one function, such as a nightlight, and therefore, for purposes of the present disclosure only, bracket associating step 100 and nightlight apparatus associating step 110 are included merely as examples of steps which may be included in process 10 for fabricating glass art 12 if such an outcome for glass art 12 is desired.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A process for fabricating a piece of glass art, comprising the steps of:
   providing a first substrate and a second substrate, wherein each of the first and second substrates comprises an upper surface and a lower surface;
   providing at least one wire, wherein the at least one wire comprises a first end, a second end, and a length therebetween;
   associating the first end of the at least one wire with the lower surface of the first substrate and the upper surface of the second substrate;
   heating the first and second substrates and the at least one wire from ambient temperature to an elevated temperature ranging from approximately 1,000 degrees Fahrenheit to approximately 2,000 degrees Fahrenheit over a period of time ranging from approximately 0.5 hours to approximately 10 hours;
   maintaining the elevated temperature for a period of time ranging from approximately 1 minute to approximately 30 minutes; and
   cooling the first and second substrates and the at least one wire from the elevated temperature to ambient temperature over a period of time ranging from approximately 0.5 hours to approximately 30 hours; and
   associating at least one ornamental member with the length of the at least one wire after the step of cooling the first and second substrates and the at least one wire from the elevated temperature to ambient temperature.

2. The process according to claim 1, wherein the step of providing a first substrate and a second substrate includes the step of providing a first substrate and a second substrate, wherein the first and second substrates comprise substantially analogous shapes and sizes.

3. The process according to claim 1, wherein the step of providing a first substrate and a second substrate includes the step of providing a substantially clear and colorless first substrate.

4. The process according to claim 1, wherein the step of providing a first substrate and a second substrate includes the step of providing a substantially transparent, colored second substrate.

5. The process according to claim 1, wherein the step of providing a first substrate and a second substrate includes the step of providing a first substrate and a second substrate, wherein each of the first and second substrates comprises 90 COE or 96 COE glass.

6. The process according to claim 1, wherein the step of associating the first end of the at least one wire with the lower surface of the first substrate and the upper surface of the second substrate includes the step of associating a substantially flattened first end of the at least one wire with the lower surface of the first substrate and the upper surface of the second substrate.

7. The process according to claim 1, further comprising the step of associating at least one glass member with the upper surface of the first substrate after the step of associating the first end of the at least one wire with the lower surface of the first substrate and the upper surface of the second substrate.

8. The process according to claim 7, wherein the step of associating at least one glass member with the upper surface of the first substrate includes the step of associating at least one substantially opaque, colored glass member with the upper surface of the first substrate.

9. The process according to claim 1, wherein the step of heating the first and second substrates and the at least one wire from ambient temperature to an elevated temperature ranging from approximately 1,000 degrees Fahrenheit to approximately 2,000 degrees Fahrenheit over a period of time ranging from approximately 0.5 hours to approximately 10 hours includes the step of heating the first and second substrates and the at least one wire from ambient temperature to an elevated temperature of approximately 1,500 degrees Fahrenheit.

10. The process according to claim 1, wherein the step of heating the first and second substrates and the at least one wire from ambient temperature to an elevated temperature ranging from approximately 1,000 degrees Fahrenheit to approximately 2,000 degrees Fahrenheit over a period of time ranging from approximately 0.5 hours to approximately 10 hours includes the step of heating the first and second substrates and the at least one wire from ambient temperature to an elevated temperature over a period of time ranging from approximately 1 hour to approximately 5 hours.

11. The process according to claim 1, wherein the step of maintaining the elevated temperature for a period of time ranging from approximately 1 minute to approximately 30 minutes includes the step of maintaining the elevated temperature for a period of time ranging from approximately 3 minutes to approximately 10 minutes.

12. The process according to claim 1, wherein the step of cooling the first and second substrates and the at least one wire from the elevated temperature to ambient temperature over a period of time ranging from approximately 0.5 hours to approximately 30 hours includes the step of cooling the first and second substrates and the at least one wire from the elevated temperature to ambient temperature over a period of time ranging from approximately 5 hours to approximately 10 hours.

13. The process according to claim 1, further comprising the step of associating the lower surface of the second substrate with a bracket after the step of cooling the first and second substrates and the at least one wire from the elevated temperature to ambient temperature.

14. The process according to claim 13, further comprising the step of associating the bracket with a nightlight apparatus after the step of associating the lower surface of the second substrate with a bracket.

15. A process for fabricating a piece of glass art, comprising the steps of:
  providing a substantially clear and colorless first substrate;
  providing a substantially transparent, colored second substrate, wherein the first and second substrates comprise substantially analogous shapes and sizes, wherein each of the first and second substrates comprises 90 COE or 96 COE glass, and wherein each of the first and second substrates comprises an upper surface and a lower surface;
  providing at least one wire, wherein the at least one wire comprises a substantially flattened first end, a second end, and a length therebetween;
  associating the substantially flattened first end of the at least one wire with the lower surface of the first substrate and the upper surface of the second substrate;
  associating at least one substantially opaque, colored glass member with the upper surface of the first substrate;
  heating the first and second substrates and the at least one wire from ambient temperature to an elevated temperature of approximately 1,500 degrees Fahrenheit over a period of time ranging from approximately 1 hour to approximately 5 hours;
  maintaining the elevated temperature for a period of time ranging from approximately 3 minutes to approximately 10 minutes;
  cooling the first and second substrates and the at least one wire from the elevated temperature to ambient temperature over a period of time ranging from approximately 5 hours to approximately 10 hours; and
  associating at least one ornamental member with the length of the at least one wire.

16. The process according to claim 15, further comprising the step of associating the lower surface of the second substrate with a bracket after the step of cooling the first and second substrates and the at least one wire from the elevated temperature to ambient temperature.

17. The process according to claim 16, further comprising the step of associating the bracket with a nightlight apparatus after the step of associating the lower surface of the second substrate with a bracket.

* * * * *